United States Patent [19]

Matsuoka et al.

[11] 4,413,179
[45] Nov. 1, 1983

[54] MECHANICAL VIBRATOR FOR LIGHT BEAM CHOPPER

[75] Inventors: Shoji Matsuoka, Tokyo; Ikutaro Kobayashi; Junichiro Minowa, both of Yokosuka, all of Japan

[73] Assignees: Anritsu Electric Company Limited; Nippon Telegraph & Telephone Public Corporation, both of Tokyo, Japan

[21] Appl. No.: 237,790

[22] Filed: Feb. 24, 1981

[30] Foreign Application Priority Data

Feb. 29, 1980 [JP] Japan ................................. 55-24133

[51] Int. Cl.³ ............................................. G01D 5/36
[52] U.S. Cl. ..................................... 250/232; 350/269
[58] Field of Search ............... 250/232, 216; 350/266, 350/269, 270, 272, 275

[56] References Cited

U.S. PATENT DOCUMENTS

| | | | |
|---|---|---|---|
| 3,110,824 | 11/1969 | Flanagan | 350/269 |
| 3,632,192 | 1/1972 | Grib | 350/269 |
| 3,805,190 | 4/1974 | Berlin et al. | 250/232 |

*Primary Examiner*—David C. Nelms
*Attorney, Agent, or Firm*—Jordan and Hamburg

[57] ABSTRACT

A tuning fork type vibrator for an optical chopper in a photosensor, which vibrator oscillates at a single frequency. The vibrator comprises vibrating plates so disposed as to face each other with a predetermined spacing therebetween, and a stem portion obtained by bonding together bent portions located at one end of each of said vibrating plates.

8 Claims, 10 Drawing Figures

MECHANICAL VIBRATOR FOR LIGHT BEAM CHOPPER

BACKGROUND OF THE INVENTION

This invention relates to a mechanical vibrator for use as an optical chopper in a photosensor.

Conventional tuning fork type vibrators driven by a piezoelectric method have two functions such as an electrical filter and a mechanical vibrator. To operate the conventional vibrators at a stable frequency and to prevent it from spurious vibrations, the vibrators should be softly mounted. In case of employing the tuning fork type vibrator as an optical chopper, it is necessary to mount the vibrator such that a center position of a vibrating plate of the vibrator is kept at an exact center of a light beam to be chopped, in order to obtain a stable on-off ratio. To this end, the vibrating plate of the vibrator should be tightly held and, otherwise, it is difficult to operate the vibrator at an stable frequency. This invention intends to solve these two subjects opposite to each other, by constructing the tuning fork structure with two thin vibrating plates. When the conventional tuning fork vibrator is employed as an optical chopper in a photosensor, retaining the vibrator in a stable manner is difficult because of its shape. This will become clear from the following description of a conventional tuning fork vibrator, with reference being made to the accompanying drawings.

FIG. 1 shows an example of a conventional tuning fork vibrator which is employed as an optical chopper, and FIGS. 2 and 3 show examples of methods through which the tuning fork vibrator of FIG. 1 may be retained.

Referring now to FIG. 1, vibrating plates 11 and 12 are shown brazed to a spacer 13. Electrodes 17 and 18 and piezoelectric members 14 and 15 for receiving electric signals are bonded to respective ones of the vibrating plates 11 and 12. The piezoelectric members 14 and 15 are connected to an amplifier (not shown), one to the input side and one to the output side thereof, by means of the electrodes 17 and 18, and an electrode 16 is connected to ground. This is the arrangement for inducing vibration in the plates 11 and 12. A light-chopping member 19 is either manufactured separately and then attached to the plate 11, or is formed unitarily with the plate 11. The same is true for a balancing member 20 which is provided on the plate 12 to counterbalance the light-chopping member 19.

The tuning fork vibrator shown in FIG. 1 is retained by inserting the spacer portion in a hole which is formed in a rubber member 21, as illustrated in FIG. 2. This may be accomplished alternatively by employing metal plates 22 and 23 to embrace the spacer portion of the vibrator, with screws 24 and 25 being used to fasten the plates tightly together as shown in FIG. 3. Before proceeding further it should be noted that the tuning fork vibrator of FIGS. 2 and 3 is shown pointing in the direction opposite to that of FIG. 1.

The method of retention shown in FIG. 2 makes it difficult to retain the tuning fork vibrator stably at a fixed position since the rubber member 21 is employed as the retaining means. With the arrangement of FIG. 3, on the other hand, vibration of one of the plates, say the plate 11, is attenuated by the metal plates 22 and 23 and is not transmitted to the plate 12. This reduces the amplitude of vibration of the vibrator and occasionally makes it impossible to initiate of an oscillation system including the vibrator and an amplifier.

A conventional tuning fork vibrator devised to prevent the attenuation of vibrations is exemplified by the arrangement shown in FIG. 4. Here the plates 11 and 12 are formed by bending a single strip of metal, and a supporting rod 26 is spot-welded to the center of the bent portion, the supporting rod 26 being soldered to a pedestal 27. With this arrangement, however, problems are encountered in retaining the plates 11 and 12 stably since the supporting rod 16 must be slender enough to prevent attenuation of vibration.

SUMMARY OF THE INVENTION

The present invention is intended to eliminate the foregoing disadvantages encountered in the prior art. Accordingly, the object of the invention is to provide a vibrator that is employed as a light chopper in a photosensor, the vibrator being capable of stable oscillation while the plates thereof are retained stably at a fixed position.

DETAILED DESCRIPTION OF PREFERRED EMBODIMENTS

Figure 1:
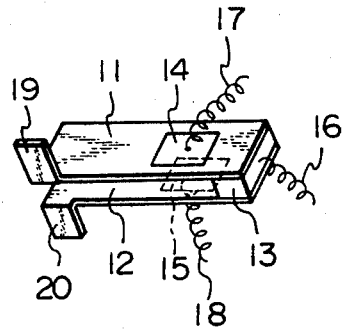
FIG. 1 is a perspective view illustrating an example of a conventional tuning fork vibrator employed as an optical chopper.
Figure 2:
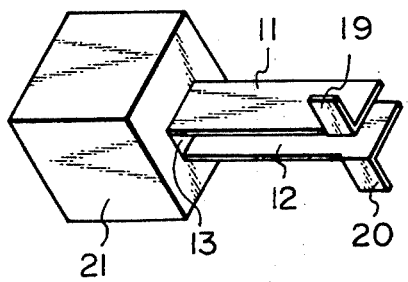
FIGS. 2 and 3 are perspective views which are useful in describing methods of retaining the tuning fork vibrator shown in FIG. 1.
Figure 3:
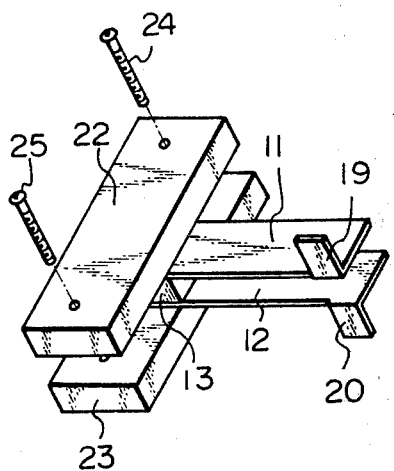
Figure 4:
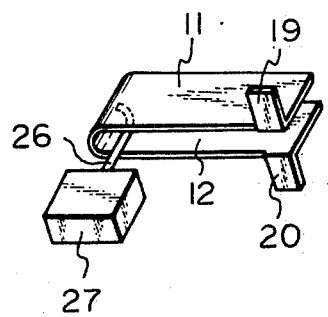
FIG. 4 is a perspective view which is useful in describing another example of a tuning fork vibrator and a method of retaining the same.
Figure 5:
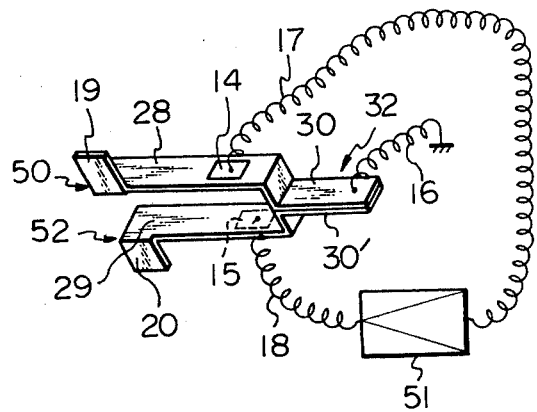
FIGS. 5, 6, 7 and 8 are perspective views showing embodiments of a vibrator employed as an optical chopper according to the present invention.

Referring now to FIG. 5, there is shown a preferred embodiment of a tuning fork vibrator adapted to serve as a vibrator for an optical chopper in accordance with the present invention. In FIG. 5, the vibrator comprises a pair of vibrating elements or plates 50 and 52, with the vibrating plate 50 including at its one end a balance member 20 and at its another end portion an piezoelectric member 14 connected to lead 17 while the vibrating plate 29 has at its one end an optical chopping element 19 and at its another end portion an piezoelectric member 15 connected to an amplifier 51 via lead 18, to vibrate the plates 28 and 29.

In accordance with the present invention the vibrator further comprises a stem portion 32 composed of flat portions 30 and 30' integral with vibrating plates 28 and 29, respectively. Each vibrating plate is an elastic metal strip having a thickness of from 0.1 to 1 millimeter and composed of a stainless steel member such as used in manufacturing springs, the strip being bent into the proper shape. The vibrator is formed by bonding the metal strips together at one end to form stem portions 30 and 30' in such a manner that the other ends of the strips face each other with a predetermined spacing between them. Other preferred embodiments of the present invention will now be described before turning to a description of vibrator operation.

Figure 6:
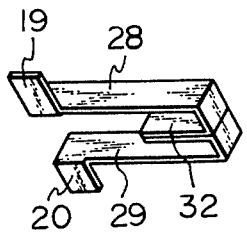

FIG. 6 illustrates another embodiment of the present invention. In this arrangement the stem portion 32 extends in the direction opposite to that shown in FIG. 5 and is situated between the plates 19 and 20.

Figure 7:
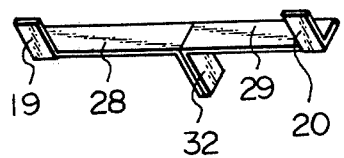
Figure 8:
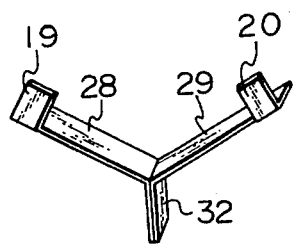

FIGS. 7 and 8 shows further preferred embodiments of the present invention, in which the vibrator does not have the U-shaped or tuning fork configuration. Here the vibrating tines 28 and 29 are bent away from each other symmetrically with respect to the stem portion 32, thereby forming a T-shaped configuration in FIG. 7 and a Y-shaped configuration in FIG. 8. Thus it is possible to select the optical chopper vibrator having the shape best suited for the particular photosensor requirement.

The embodiments illustrated in FIGS. 5 through 8 combine the two metal strips to form the vibrating plates 28 and 29 which are united at the stem portion 32 to construct the vibrator to be employed as an optical chopper. It is also possible, however, to form the entire vibrator from a single strip of metal. Specifically, this would be accomplished by folding a metal strip at the center and forming the stem portion 32 by bonding together desired lengths of the strip measured from the center thereof. Both legs of the strip would then be bent outward from the stem portion 32 so as to either extend in opposite directions or face each other with a predetermined spacing therebetween, thereby forming the vibrating plates 28 and 29. This would enable the fabrication of an optical chopper vibrator of a shape identical with any of those shown in FIGS. 5 through 8. Thus, instead of using two metal strips, a single metal strip is employed to form both of the vibrating plates 28 and 29 as well as the stem portion 32, so that the resulting vibrator has a unitary structure.

Figure 9:
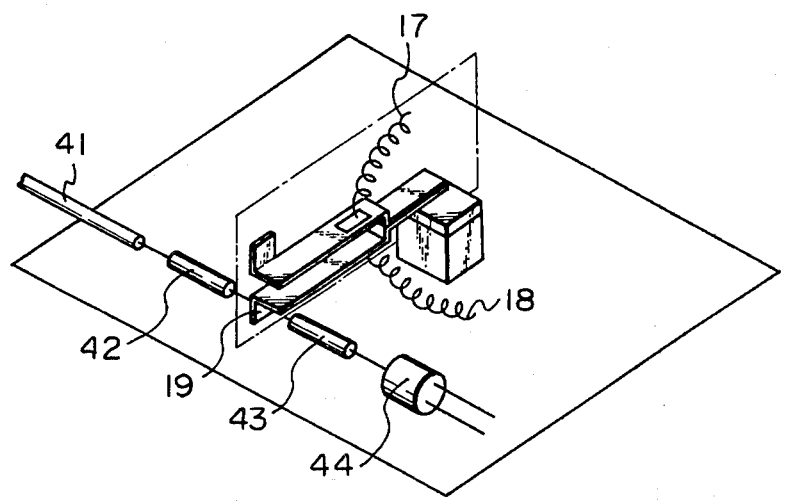
FIG. 9 is a perspective view showing a principal portion of a photosensor in which the tuning fork vibrator embodied in FIG. 5 is employed as an optical chopper.

Illustrated in FIG. 9 is an example of a photosensor employing the optical chopper vibrator of the present invention. In FIG. 9, a beam of light which is to be measured is emitted from an optical fiber 41. The beam of light is focussed by a lens 42 at the location of the light-chopping member 19 provided on the tuning fork vibrator (the vibrator shown is identical with that of FIG. 5) which may oscillate at a low frequency of 300 hertz, the light beam being rendered intermittent by the light-interrupting member 19. The intermittent light beam is then focussed by a lens 43 on a photoelectric converting element 44 which converts the light into an electric signal. The signal is amplified, synchronously detected and then displayed by such means as a meter which is not shown.

In accordance with the foregoing photosensor, the duty factor of the optical signal is 50%. This is due to the fact that the vibrating plate vibrates to provide a sine-wave. Accordingly, sensitivity is maximum when the end of the light-chopping member 19 is situated at the center of the optical axis and decreases as the end of the light chopping member 19 is displaced from the optical axis. Since a tuning fork vibrator employed as a light chopper has a small oscillatory magnitude and results in chopped signals of satisfactory stability, it is required that the spot diameter of the light beam and the positional displacement between the light beam and the vibrator be both small and stable. This relationship will be described in connection with FIG. 10.

Figure 10:
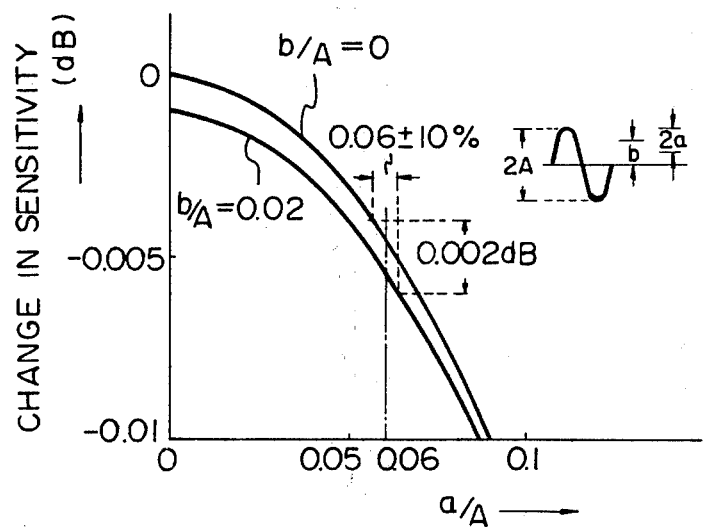
FIG. 10 is a graph showing change in sensitivity with respect to the oscillatory amplitude of an optical chopper vibrator and the distance between a center of oscillatory amplitude of the chopping element and a center of a light beam.

FIG. 10 shows the change is sensitivity with respect to the oscillatory amplitude of the light chopper vibrator shown in FIG. 5 and the position of the light beam. Here, 2A represents the change in sensitivity with respect to the oscillatory amplitude and position of the vibrating plates 28 and 29, 2a the diameter of the light beam, and b the positional displacement between the vibrating plate 28 and the light beam.

In FIG. 10, the upper of the two curves represents the change in sensitivity versus a/A when the ratio between the positional displacement b and the oscillatory amplitude A of the vibrating plate 28 is zero, that is, when the light beam is located at the center of the oscillatory amplitude of the vibrating tine. The lower of the two curves respresents the change in sensitivity versus a/A when the ratio between the positional displacement b and the amplitude A of the plate 28 has an absolute value of 0.02.

If the diameter 2a of the light beam focussed at the position of the light chopping member 19 is 60 micrometers, the oscillatory amplitude 2A of the plate 28 is 1 millimeter$\pm 10\%$ and the positional displacement b between the plate 28 and the light beam is $0\pm 20$ micrometers, then, for a/A=$0.06\pm 10\%$, the resulting error will be 0.002 dB within the range $|b/A|=0$ to 0.02. Thus it can be understood that plate 28 must have a shape that permits the vibrator to be accurately positioned and stably supported by the stem portion 30.

In accordance with the present invention as described above, the tines and stem portion of a vibrator employed as an optical chopper are formed into a unitary body to permit the stable retention of the vibrator. This reduces the error in the manner described above. Moreover, since the stem portion has a flat, plate-like configuration, the stem has a smaller cross-sectional area so that loss of vibration to the stem is reduced to approximately 1/10 that of the conventional tuning fork vibrator. The vibrator of the invention is also easy to manufacture.

What is claimed is:

1. A vibrator for an optical chopper in a photosensor, which vibrator oscillates at a single frequency, said vibrator comprising:
    a pair of separate vibrating plates of a thickness ranging from 0.1 to 1 mm and facing each other with a predetermined spacing therebetween;
    a light chopping member formed at an end of one of said vibrating plates to interrupt a light beam to be measured, at said single frequency and having a thickness equal to that of one of said vibrating plates; and
    a balancing member formed at one end of another one of said vibrating plates to maintain a balance relative to said light chopping member and having a thickness equal to that of one of said vibrating plates;
    said vibrating plates having their other ends formed with flat portions bent from said vibrating plates, respectively, in symmetry relative to one another which flat portions are bonded to one another to form a stem portion to be supported.

2. A vibrator according to claim 1, in which said vibrating plates and said stem portion are made of a metal plate.

3. A vibrator according to claim 1, in which the flat portions of said stem portion extend in a direction perpendicular to the other ends of said vibrating plates.

4. A vibrator according to claim 2, in which the flat portions of said stem portion extend between said vibrating plates.

5. A vibrator for an optical chopper in a photosensor, which vibrator oscillates at a single frequency, said vibrator comprising:
   a pair of separate vibrating plates of a thickness ranging from 0.1 to 1 mm and extending opposite to one another;
   a light chopping member formed at an end of one of said vibrating plates to interrupt a light beam to be measured, at said single frequency and having a thickness equal to that of one of said vibrating plates; and
   a balancing member formed at one end of another one of said vibrating plates to maintain a balance relative to said light chopping member and having a thickness equal to that of one of said vibrating plates;
   said vibrating plates having their other ends formed with flat portions bent from said vibrating plates, respectively, in symmetry relative to one another which flat portions are bonded to one another to form a stem portion.

6. A vibrator according to claim 1, in which said vibrating plates and said stem portion are made of a metal plate.

7. A vibrator according to claim 5, in which said vibrating plates and said stem portion are formed in a T-shaped configuration.

8. A vibrator according to claim 5, in which said vibrating plates and said stem portion are formed in a Y-shaped configuration.

* * * * *